(12) United States Patent
Rosenzweig et al.

(10) Patent No.: US 11,731,615 B2
(45) Date of Patent: Aug. 22, 2023

(54) SYSTEM AND METHOD FOR REMOTE OPERATOR ASSISTED DRIVING THROUGH COLLISION AVOIDANCE

(71) Applicant: OTTOPIA TECHNOLOGIES LTD, Tel Aviv (IL)

(72) Inventors: Amit Rosenzweig, Tel Aviv-Jaffa (IL); Shira Rotem, Tel Aviv (IL); Shaul Badusa, Tel Aviv (IL)

(73) Assignee: OTTOPIA TECHNOLOGIES LTD., Tel Aviv (IL)

( * ) Notice: Subject to any disclaimer, the term of this patent is extended or adjusted under 35 U.S.C. 154(b) by 134 days.

(21) Appl. No.: 16/860,868

(22) Filed: Apr. 28, 2020

(65) Prior Publication Data

US 2020/0339112 A1 Oct. 29, 2020

Related U.S. Application Data

(60) Provisional application No. 62/839,691, filed on Apr. 28, 2019.

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0953; B60W 30/0956; B60W 60/0054; B60W 2554/40; B60W 2554/806; B60W 60/0011; B60W 30/08; B60W 30/095; B60W 2050/0073; B60W 2050/007; B60W 2050/0074; B60W 50/08; B60W 50/087; B60W 2420/52; B60W 2420/403; B60W 2420/42; G01C 21/32; G01C 21/30; G01C 21/16; G01C 21/1652; G01C 21/1656; G01C 21/3667;
(Continued)

(56) References Cited

U.S. PATENT DOCUMENTS 11,222,299 B1 * 1/2022 Baalke .................. G06Q 10/087
2019/0163176 A1 * 5/2019 Wang .................... G05D 1/0038
(Continued)

*Primary Examiner* — Abby Y Lin
*Assistant Examiner* — Esvinder Singh
(74) *Attorney, Agent, or Firm* — M&B IP Analysts, LLC

(57) ABSTRACT

A vehicle computing unit and method for collision avoidance. The method includes calculating a dynamic trajectory of a vehicle, wherein the dynamic trajectory of the vehicle indicates a projected movement path of the vehicle; determining whether at least one risk location is within the dynamic trajectory of the vehicle; operating the vehicle based on a driving decision selected from among a first driving decision and a second driving decision when at least one risk location is within the dynamic trajectory of the vehicle, wherein the first driving decision is determined based on inputs by an operator of the vehicle, wherein the second driving decision is determined by a vehicle computing unit of the vehicle; and operating the vehicle based on the inputs by the operator of the vehicle when no risk location is within the dynamic trajectory of the vehicle.

15 Claims, 7 Drawing Sheets

(51) Int. Cl.
*G01C 21/32* (2006.01)
*B60W 60/00* (2020.01)
*G05D 1/02* (2020.01)

(52) U.S. Cl.
CPC ......... *B60W 60/0054* (2020.02); *G01C 21/32* (2013.01); *G05D 1/0214* (2013.01)

(58) Field of Classification Search
CPC ............ G01C 21/3614; G01C 21/3804; G01C 21/3807; G01C 21/3815; G05D 1/0214; G05D 2201/0213; G05D 1/0038; G05D 1/0016; G05D 1/0061; G05D 1/0066; G05D 1/0212; G05D 1/0223; G05D 1/0238; G05D 1/0246; G05D 1/0253; G05D 1/024; G05D 1/0248; G05D 1/0255; G05D 1/0257; G01S 13/931; G01S 15/931

See application file for complete search history.

(56) References Cited

U.S. PATENT DOCUMENTS

| | | | |
|---|---|---|---|
| 2020/0064825 A1* | 2/2020 | Woodley | B62D 15/0285 |
| 2020/0114509 A1* | 4/2020 | Lee | G01S 17/89 |
| 2020/0180618 A1* | 6/2020 | Ohmura | G08G 1/16 |
| 2020/0211394 A1* | 7/2020 | King | G08G 1/166 |
| 2020/0310417 A1* | 10/2020 | Pedersen | G05D 1/0088 |
| 2020/0333778 A1* | 10/2020 | Lambert | G05D 1/0255 |
| 2021/0237769 A1* | 8/2021 | Ostafew | G06K 9/00805 |

\* cited by examiner

SYSTEM AND METHOD FOR REMOTE OPERATOR ASSISTED DRIVING THROUGH COLLISION AVOIDANCE

CROSS-REFERENCE TO RELATED APPLICATIONS

This application claims the benefit of U.S. Provisional Application No. 62/839,691 filed on Apr. 28, 2019, the contents of which are hereby incorporated by reference.

TECHNICAL FIELD

The present disclosure relates generally to assisted driving, and more specifically to collision avoidance.

BACKGROUND

During normal operation, autonomous vehicles may encounter situations that they are not configured to handle properly. Existing autonomous driving solutions are not mature enough to be able to properly handle all of the various edge cases that occur on the road, particularly in complex environments such as city centers, business districts, enterprise campuses, and the like. Some particular examples of edge cases that are difficult for existing solutions to handle include following instructions from police officers guiding traffic, navigating around construction sites, navigating in areas lacking high definition map data, navigating in areas with inaccurate map data, mismatches between posted speed limits and actual speeds of typical drivers, maneuvering in parking lots with many parked cars, determining whether an obstacle in the road can be safely driven over (e.g., a fallen tree branch which would not affect the vehicle), and the like.

In order to handle these edge cases, some existing solutions utilize a remote human operator situated in a control center. A bi-directional communication link is established between the vehicle and a computing device operated by the remote human operator. Through this bi-directional communication link, the remote human operator receives video and other sensory data related to the vehicle's surroundings (e.g., data from internal and external cameras, Light Detection and Ranging [LiDAR] sensors, ultrasonic sensors, odometry sensors, etc.). The remote human operator provides inputs to the vehicle instructing the vehicle to perform actions to avoid risks.

Further, some existing solutions provide passive warning systems to aid the human operator. For example, lane keeping warning systems alert the operator of unintended lane departures and forward collision warning systems indicate when, based on the current driving decisions, a collision is likely imminent. In such passive warning systems, the operator needs to actually make the driving decisions to return to their lane or avoid the risk of collision.

In contrast to passive warning systems, active safety systems take action when a risk is imminent. For example, forward collision avoidance systems identify imminent collisions and brake without any intervention by a human operator. Likewise, collision avoidance for intersection systems identify when another vehicle is approaching the intersection that will not allow for safe entrance and brakes in order to prevent the operator from causing the vehicle to enter the intersection.

In existing advanced driver assistance systems, the human operator is typically given priority over the passive warning systems or active safety systems. For example, the human operator may ignore the passive warnings or override the driving decisions of the active safety systems based on a misunderstanding of the risks around the vehicle.

Although remote human operators allow for handling edge cases that existing solutions cannot handle, use of human operators introduces new possibilities of human error. Human operators may be affected by disadvantages such as fatigue, distraction, and the like. Further, when remote operators switch between multiple vehicles in a short time period, they may become disoriented and mix up vehicle circumstances.

Additionally, when latency is high, communications between the remote human operator and the vehicle may be delayed and, therefore, prevent the human operator from relaying instructions quickly enough to avoid an accident.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for collision avoidance. The method comprises: calculating a dynamic trajectory of a vehicle, wherein the dynamic trajectory of the vehicle indicates a projected movement path of the vehicle; determining whether at least one risk location is within the dynamic trajectory of the vehicle; operating the vehicle based on a driving decision selected from among a first driving decision and a second driving decision when at least one risk location is within the dynamic trajectory of the vehicle, wherein the first driving decision is determined based on inputs by an operator of the vehicle, wherein the second driving decision is determined by a vehicle computing unit of the vehicle; and operating the vehicle based on the inputs by the operator of the vehicle when no risk location is within the dynamic trajectory of the vehicle.

Certain embodiments disclosed herein also include a non-transitory computer readable medium having stored thereon causing a processing circuitry to execute a process, the process comprising: calculating a dynamic trajectory of a vehicle, wherein the dynamic trajectory of the vehicle indicates a projected movement path of the vehicle; determining whether at least one risk location is within the dynamic trajectory of the vehicle; operating the vehicle based on a driving decision selected from among a first driving decision and a second driving decision when at least one risk location is within the dynamic trajectory of the vehicle, wherein the first driving decision is determined based on inputs by an operator of the vehicle, wherein the second driving decision is determined by a vehicle computing unit of the vehicle; and operating the vehicle based on the inputs by the operator of the vehicle when no risk location is within the dynamic trajectory of the vehicle.

Certain embodiments disclosed herein also include a system for collision avoidance. The system comprises: a processing circuitry; and a memory, the memory containing instructions that, when executed by the processing circuitry, configure the system to: calculate a dynamic trajectory of a vehicle, wherein the dynamic trajectory of the vehicle indicates a projected movement path of the vehicle; determine whether at least one risk location is within the dynamic trajectory of the vehicle; operate the vehicle based on a driving decision selected from among a first driving decision and a second driving decision when at least one risk location is within the dynamic trajectory of the vehicle, wherein the first driving decision is determined based on inputs by an operator of the vehicle, wherein the second driving decision is determined by a vehicle computing unit of the vehicle; and operate the vehicle based on the inputs by the operator of the vehicle when no risk location is within the dynamic trajectory of the vehicle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
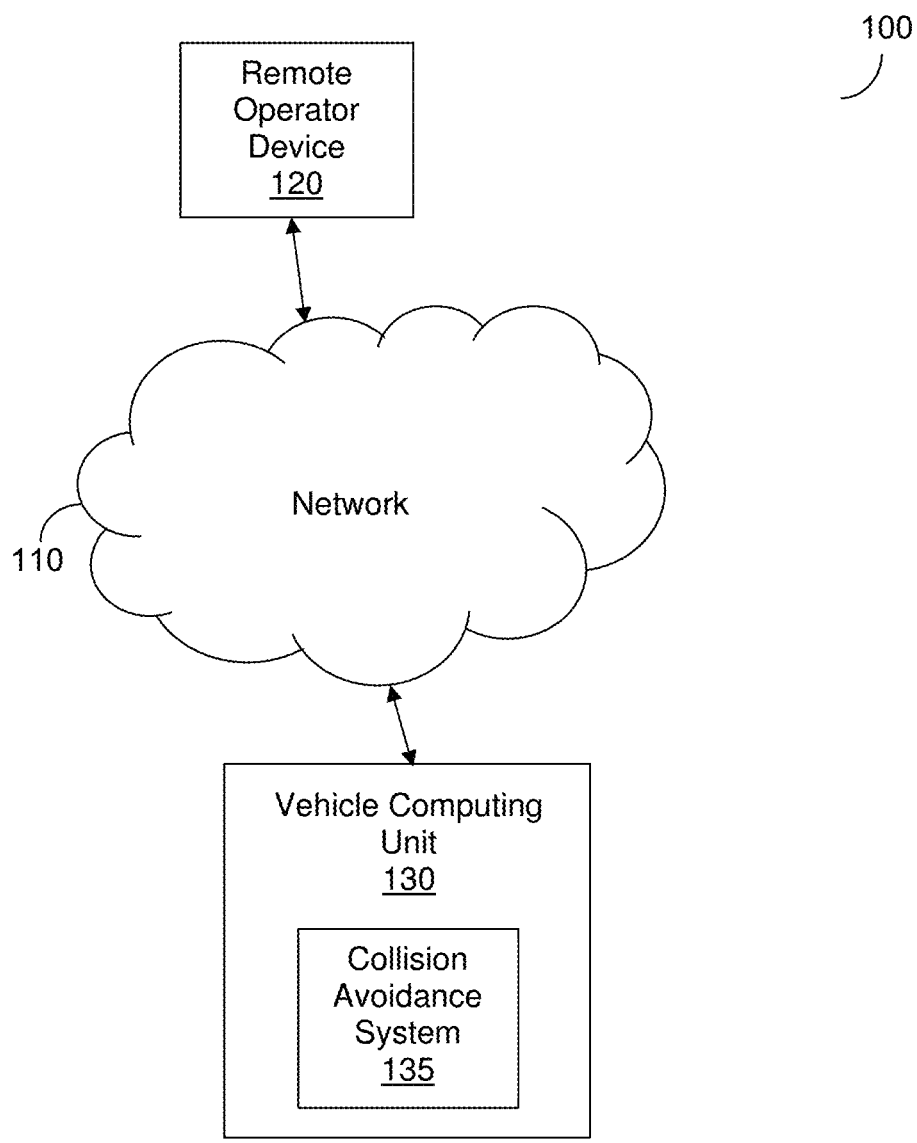
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Due to the issues with remote human operators noted above, it has been identified that the optimal approach to teleoperation of a vehicle would be to allow remote human operators to make driving decisions while prioritizing driving decisions of an automated collision avoidance system when there is a conflict between the human operator and the automated collision avoidance system. To this end, the disclosed embodiments provide a collision avoidance system configured to make overriding collision avoidance decisions. Further, the disclosed embodiments provide techniques for improved collision avoidance decisions.

The various disclosed embodiments include a method and system for collision avoidance. The disclosed embodiments are utilized in tandem with a remote operator of a vehicle in order to avoid risks while allowing for some degree of remote control, thereby improving risk avoidance overall.

In an embodiment, a dynamic trajectory of a vehicle is calculated based on sensor readings from sensors deployed with the vehicle. The dynamic trajectory is a visualization of a future movement path that the vehicle is about to take. Potential risk locations are identified based on the sensor readings. Real-time maps of the vehicle's surroundings are created for each sensor. The real-time maps are populated with the potential risk locations. The dynamic trajectory of the vehicle is translated to the real-time maps. Based on this translation, it is determined whether any risks overlap with the dynamic trajectory of the vehicle.

FIG. 1 shows an example network diagram 100 utilized to describe the various disclosed embodiments. In the example network diagram 100, a remote operator device 120 and a vehicle computing unit 130 are communicatively connected via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

The remote operator device 120 may be, but is not limited to, a personal computer, a laptop, a tablet computer, a smartphone, a wearable computing device, or any other device capable of receiving inputs and displaying feedback information.

The vehicle computing unit 130 is installed in a vehicle and is configured to perform autonomous driving for the vehicle. The vehicle computing unit 130 is further configured to perform collision avoidance activities in accordance with the disclosed embodiments. To this end, the vehicle computing unit 130 includes a collision avoidance system 135. The collision avoidance system 135 may be a logical subcomponent of the vehicle computing unit 130 or may be a hardware component of the vehicle computing unit 130.

Figure 2:
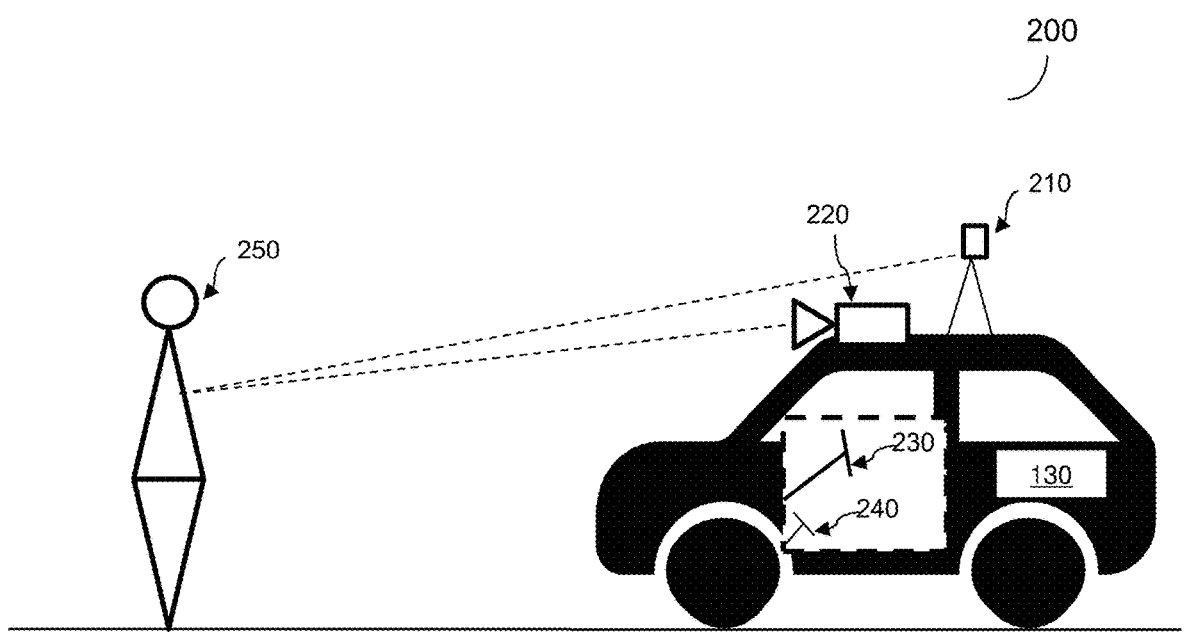
FIG. 2 is a vehicle components diagram utilized to describe various disclosed embodiments.

FIG. 2 is an example vehicle components diagram 200 utilized to describe various disclosed embodiments. The vehicle components diagram 200 illustrates an example vehicle environment in which the disclosed embodiments operate.

The vehicle components diagram 200 includes the vehicle computing unit 130, one or more sensors 210, a teleoperation camera 220, a vehicle steering wheel 230, vehicle pedals 240, and an obstacle 250.

The vehicle computing unit 130 is configured to perform partially autonomous and partially operator-oriented driving, and is more specifically configured to perform overriding collision avoidance in accordance with the disclosed embodiments. To this end, the vehicle computing unit 130 receives video or a combination of images and video captured by the teleoperation camera 220 as well as other sensory signals captured by the sensors 210. The sensors 210 provide sensory signals that may be relevant to the remote operator's driving decisions, to autonomous driving decisions, or both. The sensors 210 may be, but are not limited to, Radar sensors, Light Detection and Ranging [LiDAR] sensors, ultrasonic sensors, odometry sensors, combinations thereof, and the like.

The vehicle computing unit 130 is configured to control the vehicle steering wheel 230 and the vehicle pedals 240 in order to autonomously control the vehicle and to navigate. In an embodiment, when the vehicle approaches an obstacle such as the obstacle 250 (e.g., as determined based on readings from the sensors 210 and the teleoperation camera 220), the vehicle computing unit 130 is configured to prompt a remote human operator for inputs indicating driving decisions for navigating around the obstacle.

If, as described herein, the vehicle computing unit 130 determines that a risk is within a dynamic trajectory representing a future path of the vehicle's movement, the vehicle computing unit 130 overrides the driving decisions by the remote human operator and takes collision avoidance actions. Determining when to override driving decisions by the operator and taking collision avoidance actions is described further below with respect to FIGS. 4 and 6.

Figure 3:
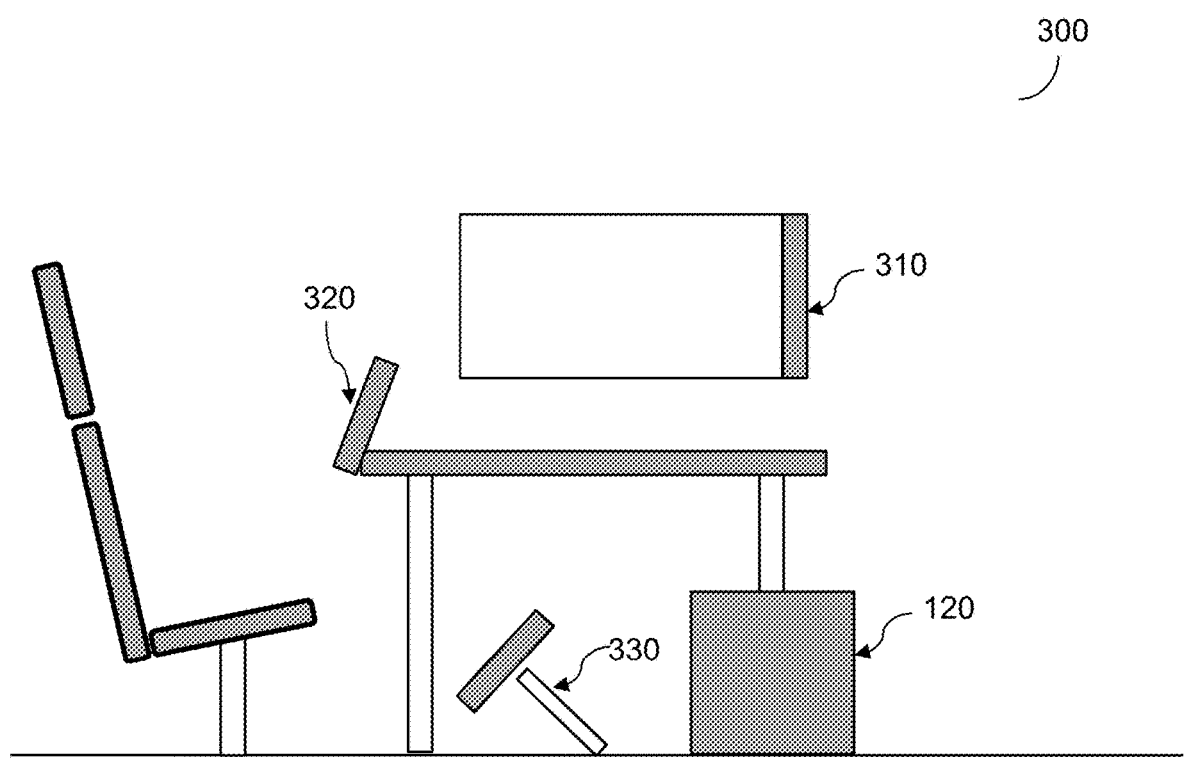
FIG. 3 is an operator station components diagram utilized to describe various disclosed embodiments.

An example setup for a remote human operator providing inputs to the vehicle computing unit 130 is now described with respect to FIG. 3. FIG. 3 is an example operator station components diagram 300 utilized to describe various disclosed embodiments.

The operator station components diagram 300 includes the remote operator device 120, one or more operator screens 310, an operator control wheel 320, and operator control pedals 330. The remote operator device 120 is a computing device configured to receive data from the operator control wheel 320 and the operator control pedals 330 as well as to send inputs determined based on that data to the vehicle computing device 130 (not shown in FIG. 3).

The operator screens 310 are computer monitors or other displays capable of displaying information received from the vehicle computing unit 130. Such data includes, but is not limited to, feedback data, sensory data, visual data captured by cameras, combinations thereof and the like. In particular, the visual data includes video or other content demonstrating the environment surrounding the vehicle and, in particular potential risks such as the obstacle 250.

The operator control wheel 320 and operator control pedals 330 are input devices configured to receive input data from a remote human operator (not shown) via interaction with the wheel 320 and pedals 330. The input data may be translated, by the remote operator device 120, into a format usable by the vehicle computing device 130 or may be sent directly such that the vehicle computing device 130 may determine driving actions to take based at least partially on that input data.

It should be noted that the diagrams shown in FIGS. 1-3 are merely examples utilized to convey the kinds of environments in which the disclosed embodiments operate, and that the disclosed embodiments are not limited to these particular environments and configurations. Other environments and configurations may be equally used without departing from the scope of the disclosure. As a particular example, a vehicle without conventional steering wheel or pedals may be controlled without departing from the scope of the disclosure.

Figure 4:
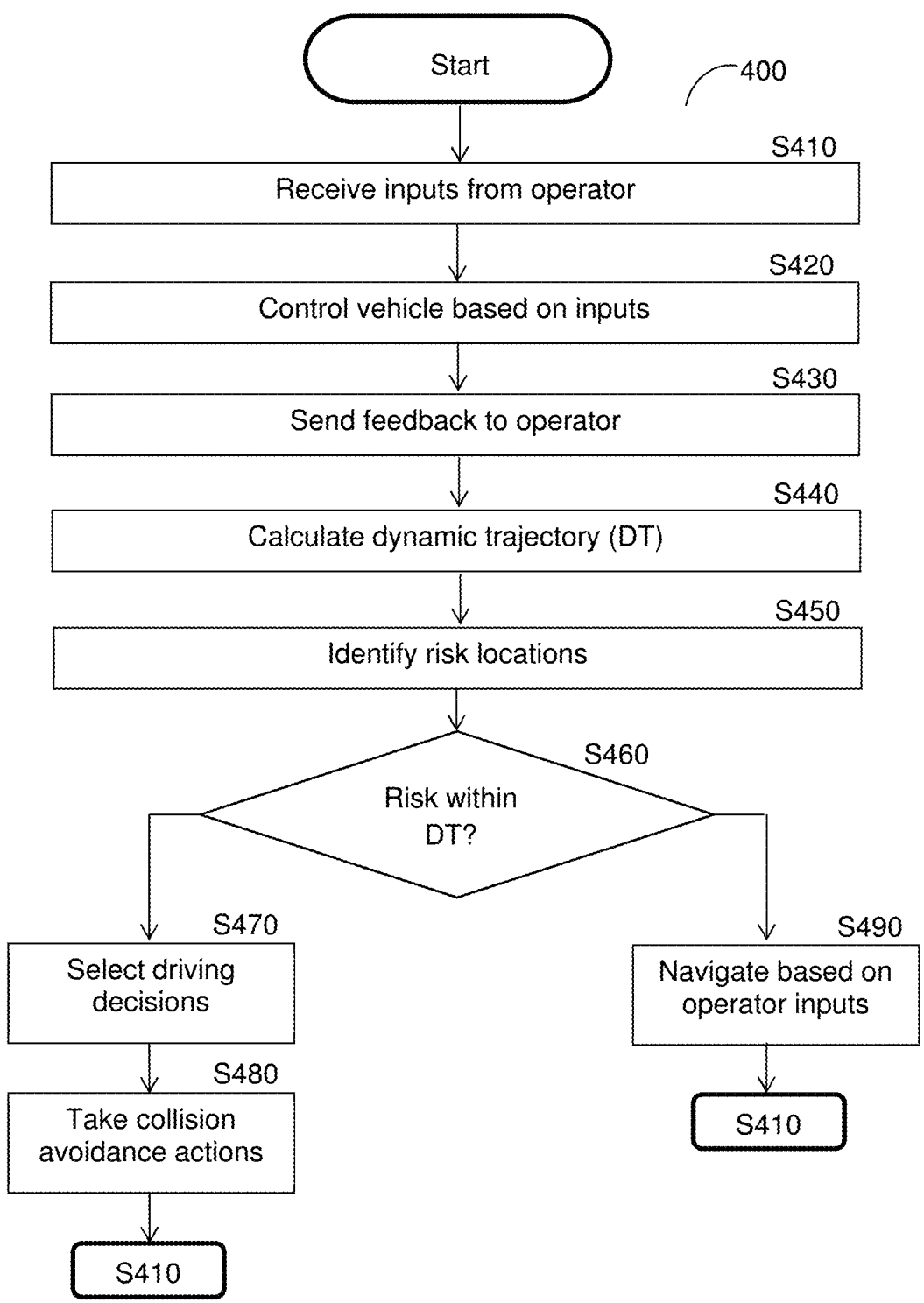
FIG. 4 is a flowchart illustrating a method for collision avoidance according to an embodiment.

FIG. 4 is a flowchart 400 illustrating a method for collision avoidance according to an embodiment. In an embodiment, the method is performed by the vehicle computing unit 130, FIG. 1.

At S410, inputs are received from a remote operator. The inputs may be, or may be based on, pedal and wheel position data obtained at the location of the operator (e.g., via the operator control wheel 320 and pedals 330, FIG. 3).

At S420, a vehicle is controlled based on the inputs. In an example implementation, S420 includes translating the operator's inputs into actions by pedals and wheels of the vehicle (e.g., the wheel 230 and pedals 240, FIG. 2).

At S430, feedback is sent to the operator. The feedback indicates the current positions of the wheel and pedal of the vehicle and may be provided as, for example, information to be displayed to the operator, changes in orientation or position of a wheel and pedals used by the operator, a combination thereof, and the like.

At S440, a dynamic trajectory of the vehicle is calculated. The dynamic trajectory is a projected future movement of the vehicle based on the inputs received from the operator. Thus, the dynamic trajectory represents the path that the vehicle would take if it were to navigate based on the operator's inputs. Accordingly, if there is a risk within the dynamic trajectory, it may be concluded that the operator should be overridden in order to avoid the risk. Thus, the dynamic trajectory acts as a safety buffer for risk avoidance.

In an embodiment, calculating the dynamic trajectory includes calculating the stopping distance of the vehicle. To this end, in an example implementation, the stopping distance may be calculated using the following equation:

$$d_s = v \times t + \frac{a^2}{2} + \frac{v^2}{2 \times (df)} \qquad \text{Equation 1}$$

In Equation 1, $d_s$ is the stopping distance of the vehicle, v is the current velocity of the vehicle, t is the reaction time of the vehicle's systems, a is the current acceleration, and df is a constant value that is predetermined based on required force standards for the braking system used by the vehicle that is selected to safely cover a wide range of surfaces. The stopping distance is the distance before the vehicle comes to a complete stop (i.e., velocity becomes zero).

In an example implementation, the radius of movement of the vehicle is determined using the Ackermann model for steering geometry. The radius and stopping distance are utilized to calculate an arc of movement representing the angular stopping distance of the vehicle. The arc of movement is applied to two points from the center of the vehicle, where the points are located far enough apart to minimize the chance of collision. In this regard, it has been identified that, for a 1.8 meter wide vehicle, placing the first point of each arc at a position 1.25 meters away from the center of the vehicle puts the arcs at a 0.35 meter distance which, in turn, significantly reduces the chance of collision. Other distances may be equally utilized, particularly when the width of the vehicle varies.

Figure 5:
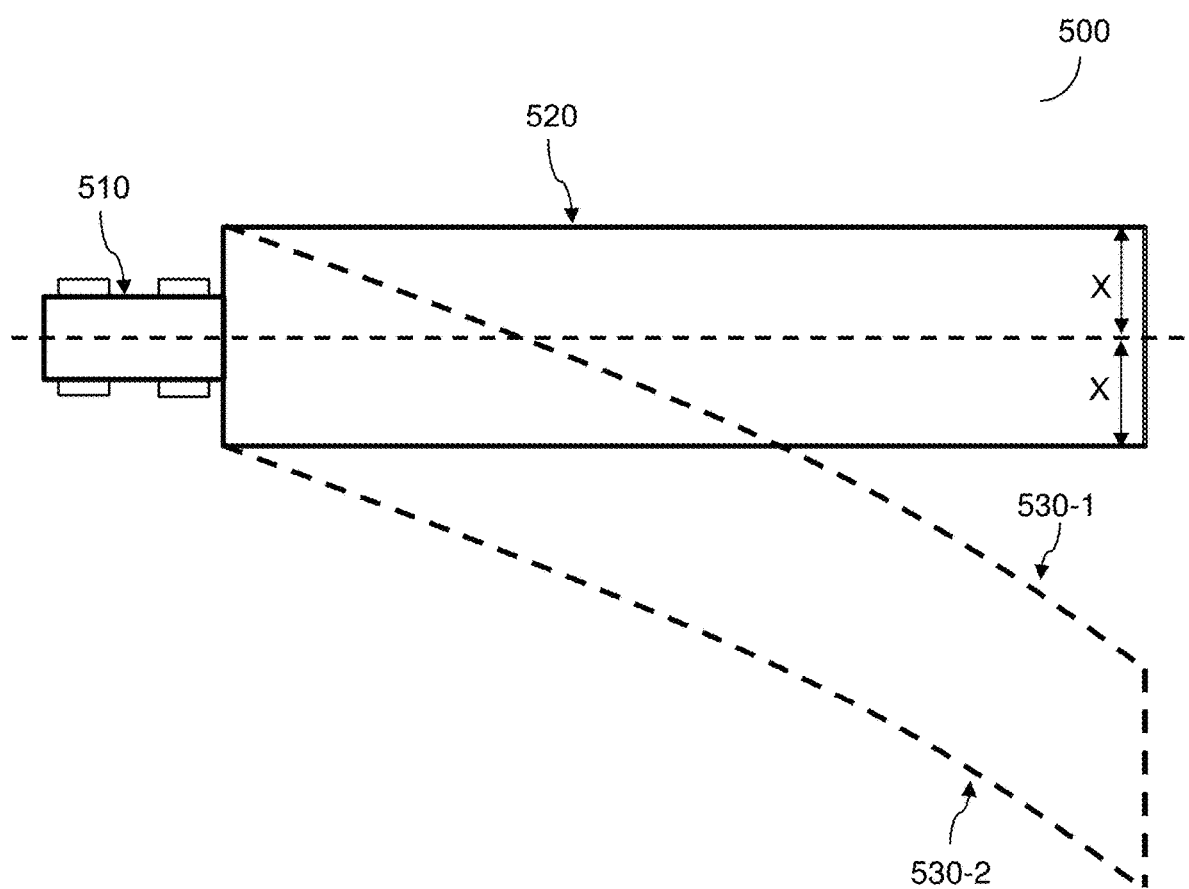
FIG. 5 is a trajectory diagram visually depicting a dynamic trajectory of a vehicle calculated in accordance with the disclosed embodiments.

An example angular stopping distance illustration used to demonstrate a dynamic trajectory is shown in FIG. 5. FIG. 5 is a trajectory diagram 500 visually depicting a dynamic trajectory of a vehicle calculated in accordance with the disclosed embodiments.

The trajectory diagram 500 shows a vehicle 510 following a current navigation path 520 with arcs 530-1 and 530-2 that collectively form the dynamic trajectory of the vehicle 510. Each arc 530 begins at a predetermined distance X from the center axis of the vehicle.

Returning to FIG. 4, at S450, risk locations are identified. In an embodiment S450 includes receiving sensor data collected by scanning the vehicle's environment for potential risks and identifying risk locations based on the sensor data. The sensor data may be from a single sensor or from a fusion of multiple sensors.

Figure 6:
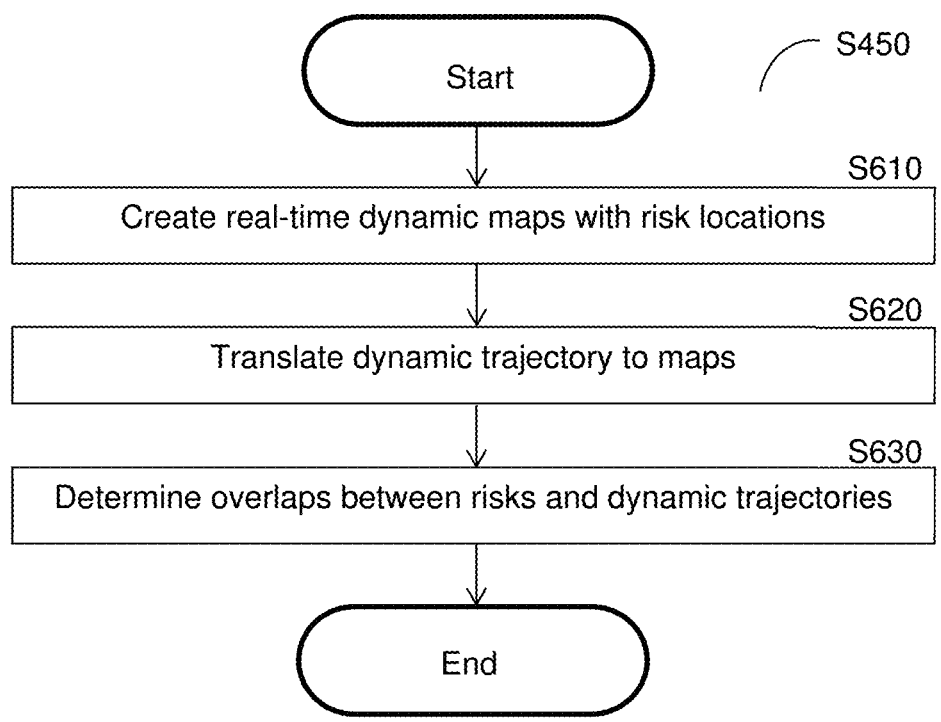
FIG. 6 is a flowchart illustrating a method for identifying risks to be avoided according to an embodiment.

FIG. 6 is a flowchart S450 illustrating a method for identifying risks to be avoided according to an embodiment. In an embodiment, the method is performed by the vehicle computing unit 130, FIG. 1.

At S610, real-time dynamic maps are created based on sensor data collected while scanning the environment around the vehicle. In an embodiment, a respective real-time dynamic map is created for each type of sensor collecting data related to the environment of the vehicle. Each real-time dynamic map is created based on the most recent sensor data.

In an embodiment, each real-time dynamic map includes a location of any risks within the map as determined based on the sensor data for the respective type of sensor. Such risks may include, but are not limited to, obstacles.

Although the real-time dynamic maps account for risks already within the vehicle's dynamic trajectory, this does not necessarily account for approaching risks that may soon enter the vehicle's dynamic trajectory. Moving risks such as, for example, other vehicles, cyclists, and pedestrians, may present risks even when they are not currently within the projected path of the vehicle. To this end, in another embodiment, the risk locations may account for moving risks. In such an embodiment, at least some of the risk locations may be included in the real-time dynamic maps as risk dynamic trajectories indicating a current projected path of the risk.

In a further embodiment, the risk dynamic trajectories are identified using a classification and tracking engine. To this end, risks are classified into types. Each type of risk is tracked in order to sample its velocity and heading. For each risk, a dynamic risk trajectory is calculated based on its classification and current vector of movement. In an embodiment, the risk dynamic trajectory of each risk is calculated as described above for dynamic trajectory of the vehicle. In a further embodiment, the risk dynamic trajectory calculation may be adjusted based on the classification (e.g., a human and a vehicle have different movement patterns and stopping behaviors such that their respective trajectories will be slightly different even when moving at the same speed and direction).

At S620, the dynamic trajectory of the vehicle is translated to each of the real-time dynamic maps. In an embodiment, the dynamic trajectory of the vehicle is calculated as described above. Translating the dynamic trajectory into the real-time dynamic maps allows for compiling risks' locations with the dynamic trajectory and, therefore, which risks actually present threats to the vehicle.

At S630, overlaps between the risk locations and the dynamic trajectory are determined in order to determine whether any risks are within the dynamic trajectory.

In an embodiment, the real-time dynamic maps are constantly created and checked against the dynamic trajectory of the vehicle as described above with respect to S610 through S630. The dynamic trajectory at each iteration is the current dynamic trajectory at that time.

Returning to FIG. 4, at S460 it is determined whether any risks are within the dynamic trajectory of the vehicle. If so, execution continues with S470; otherwise, execution continues with S490.

At S470, when it is determined that there is a risk within the vehicle's dynamic trajectory, one or more automated driving decisions for collision avoidance actions are selected. In an embodiment, the determined automated driving decisions are selected from between driving decisions indicated in the operator's inputs and driving decisions determined by a vehicle computing unit (e.g., the vehicle computing unit 130, FIG. 1) such that the more conservative driving decision is selected.

In an example implementation, the automated driving decisions include braking. To this end, in an embodiment, S470 further includes calculating a deceleration force value needed to reach a full stop before the vehicle collides with the risk. In a further embodiment, the deceleration force value needed to reach a full stop is compared to a braking force indicated by inputs from the operator in order to determine if the operator's braking force is sufficient to reach a full stop and prevent the collision. Thus, in such an embodiment, the higher braking force value is selected to be used for collision avoidance.

By selecting the braking force value that is higher, the method effectively includes managing a silent dialogue between the operator and the vehicle computing unit performing the method. At each moment, the side having the more conservative driving decisions (i.e., less likely to cause risk such as by having the greater deceleration force) is selected and driving actions are chosen based on that selection. This dialogue maximizes the safety of driving decisions as compared to purely autonomous or purely remotely operated decisions.

In some embodiments, determination of the driving decisions may be subject to operator override. In particular, such overriding may be necessary when the operator attempts to perform a specific action that will avoid a collision or other issue despite the risk being within the vehicle's current dynamic trajectory. Such actions may include, but are not limited to, crossing very narrow corridors, performing sharp U-turns, running over an object that will not affect the vehicle's navigation (e.g., an empty garbage bag, etc.). In an example implementation, the remote operator may have access to an override button or may otherwise provide inputs to select an override option. When the override option is selected (i.e., the override option selection is still valid), the dynamic trajectory is not calculated again until the override option is unselected. As a result, no risks are identified within the dynamic trajectory and, therefore, the operator's driving decisions are utilized without needing to select between the vehicle computing unit's decisions and the operator's decisions.

At S480, collision avoidance actions are taken, thereby avoiding the risk, and execution may continue with S410. In an embodiment, S480 includes causing brakes of the vehicle to be applied based on the selected braking force. In a further embodiment, S480 may further include providing information regarding the override to the operator as feedback.

In an embodiment, braking continues until the risk is no longer within the dynamic trajectory of the vehicle (e.g., as determined based on the current dynamic trajectory and most recent sensor data). Until that occurs, the more conservative driving decisions between those made by the vehicle computing unit and those made by the remote operator continue to be selected. This prevents the operator from inadvertently colliding with the risk by pressing the gas pedal while the risk is still within the vehicle's trajectory.

At S490, when it is determined that there is not a risk within the vehicle's dynamic trajectory, navigation is performed based on the operator's inputs, i.e., the operator is allowed to control the vehicle.

Figure 7:
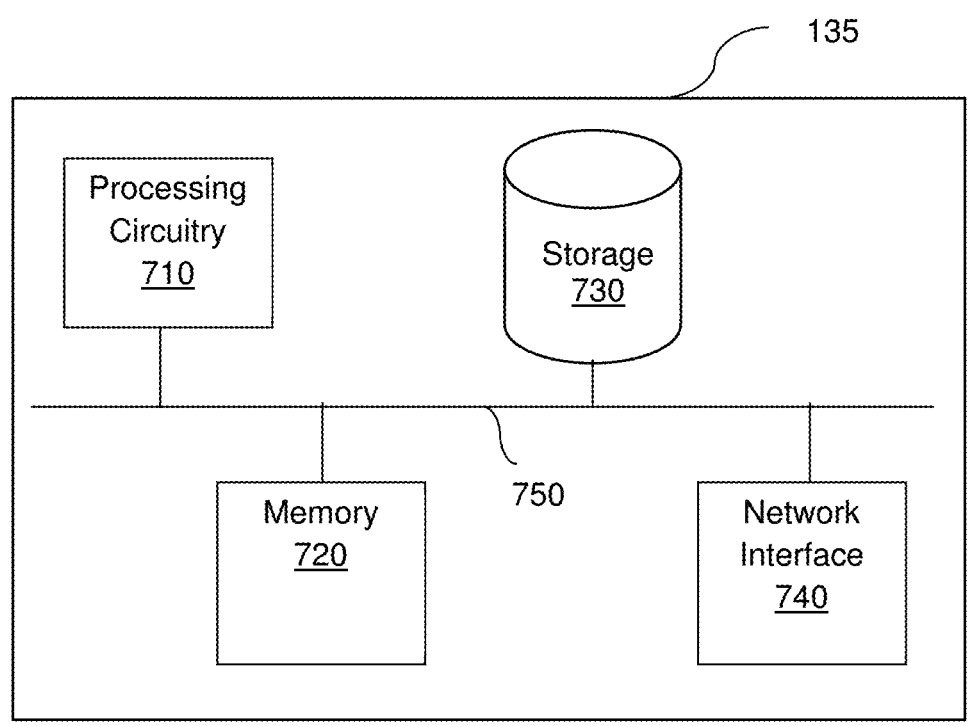
FIG. 7 is a schematic diagram of a vehicle computing unit according to an embodiment.

FIG. 7 is an example schematic diagram of a vehicle computing unit 130 according to an embodiment. The vehicle computing unit 130 includes a processing circuitry 710 coupled to a memory 720, a storage 730, and a network interface 740. In an embodiment, the components of the vehicle computing unit 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the vehicle computing unit 130 to communicate with the remote operator device 120 for the purpose of receiving control inputs, sending feedback, and the like.

It should be understood that the embodiments described herein are not limited to the specific architecture illustrated in FIG. 7, and other architectures may be equally used without departing from the scope of the disclosed embodiments.

It should also be noted that the disclosed embodiments are generally described with respect to a remote operator, but that the disclosed embodiments may, at least in some implementations, be applicable to instances where the operator is in the vehicle, i.e., where the operator is not a remote operator.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for collision avoidance, comprising:
calculating a dynamic trajectory of a vehicle, wherein the dynamic trajectory of the vehicle indicates a projected movement path of the vehicle;
creating a plurality of real-time dynamic maps based on sensor data collected by a plurality of sensors scanning an environment around the vehicle, wherein the plurality of real-time dynamic maps includes a plurality of risk locations, wherein each of the plurality of real-time dynamic maps is created for a distinct type of sensor among the plurality of sensors, wherein a respective real-time dynamic map of the plurality of real-time dynamic maps is created for each distinct type of sensor among the plurality of sensors; and
translating the dynamic trajectory of the vehicle to each of the plurality of real-time dynamic maps;
determining whether each of the plurality of risk locations is within the dynamic trajectory of the vehicle based on the translated dynamic trajectory and each real-time dynamic map, wherein each real-time dynamic map includes a subset of the plurality of risk locations determined based on sensor data for the respective distinct type of sensor for which the real-time dynamic map is created;
operating the vehicle based on a driving decision selected from among a first driving decision and a second driving decision when at least one risk location of the plurality of risk locations is within the dynamic trajectory of the vehicle, wherein the first driving decision is determined based on inputs by an operator of the vehicle, wherein the second driving decision is determined by a vehicle computing unit of the vehicle; and
operating the vehicle based on the inputs by the operator of the vehicle when no risk location is within the dynamic trajectory of the vehicle.

2. The method of claim 1, wherein at least one of the at least one risk location is represented by a risk dynamic trajectory, wherein each risk dynamic trajectory indicates a projected movement path of the risk.

3. The method of claim 2, further comprising:
classifying a risk associated with each of the at least one risk location, wherein the risk dynamic trajectory of each risk location is calculated based on the classification of the risk associated with the risk location.

4. The method of claim 1, wherein each of the first driving decision and the second driving decision includes a respective deceleration force value, wherein the selected driving decision is the driving decision among the first driving decision and the second driving decision including the highest respective deceleration force value.

5. The method of claim 1, wherein the dynamic trajectory of the vehicle is calculated based on a stopping distance and a radius of movement of the vehicle.

6. The method of claim 5, the vehicle having a front end and a center axis, wherein the dynamic trajectory includes two arcs, each arc representing the angular stopping distance of the vehicle, wherein each arc begins at a point along the front end of the vehicle, wherein the two arcs are located at a predetermined distance from the center axis of the vehicle.

7. The method of claim 1, further comprising:
receiving an override option selection from the operator, wherein the dynamic trajectory is not calculated again while the override option selection is still valid such that none of the at least one risk location is determined as being within the dynamic trajectory until the override option is unselected.

8. A non-transitory computer readable medium having stored thereon instructions for causing a processing circuitry to execute a process, the process comprising:
calculating a dynamic trajectory of a vehicle, wherein the dynamic trajectory of the vehicle indicates a projected movement path of the vehicle;
creating a plurality of real-time dynamic maps based on sensor data collected by a plurality of sensors scanning an environment around the vehicle, wherein the plurality of real-time dynamic maps includes a plurality of risk locations, wherein each of the plurality of real-time dynamic maps is created for a distinct type of sensor among the plurality of sensors, wherein a respective real-time dynamic map of the plurality of real-time dynamic maps is created for each distinct type of sensor among the plurality of sensors; and
translating the dynamic trajectory of the vehicle to each of the plurality of real-time dynamic maps;
determining whether each of the plurality of risk locations is within the dynamic trajectory of the vehicle based on the translated dynamic trajectory and each real-time dynamic map, wherein each real-time dynamic map includes a subset of the plurality of risk locations determined based on sensor data for the respective distinct type of sensor for which the real-time dynamic map is created;
operating the vehicle based on a driving decision selected from among a first driving decision and a second driving decision when at least one risk location of the plurality of risk locations is within the dynamic trajectory of the vehicle, wherein the first driving decision is determined based on inputs by an operator of the vehicle, wherein the second driving decision is determined by a vehicle computing unit of the vehicle; and
operating the vehicle based on the inputs by the operator of the vehicle when no risk location is within the dynamic trajectory of the vehicle.

9. A vehicle computing unit for forward collision avoidance, comprising:
a processing circuitry; and
a memory, the memory containing instructions that, when executed by the processing circuitry, configure the vehicle computing unit to:
calculate a dynamic trajectory of a vehicle, wherein the dynamic trajectory of the vehicle indicates a projected movement path of the vehicle;
create a plurality of real-time dynamic maps based on sensor data collected by a plurality of sensors scanning an environment around the vehicle, wherein the plurality of real-time dynamic maps includes a plurality of risk locations, wherein each of the plurality of real-time dynamic maps is created for a distinct type of sensor among the plurality of sensors, wherein a respective real-time dynamic map of the plurality of real-time dynamic maps is created for each distinct type of sensor among the plurality of sensors; and
translate the dynamic trajectory of the vehicle to each of the plurality of real-time dynamic maps;
determine whether each of the plurality of risk locations is within the dynamic trajectory of the vehicle based on the translated dynamic trajectory and each real-time dynamic map, wherein each real-time dynamic map includes a subset of the plurality of risk locations determined based on sensor data for the respective distinct type of sensor for which the real-time dynamic map is created;
operate the vehicle based on a driving decision selected from among a first driving decision and a second driving decision when at least one risk location of the plurality of risk locations is within the dynamic trajectory of the vehicle, wherein the first driving decision is determined based on inputs by an operator of the vehicle, wherein the second driving decision is determined by a vehicle computing unit of the vehicle; and
operate the vehicle based on the inputs by the operator of the vehicle when no risk location is within the dynamic trajectory of the vehicle.

10. The vehicle computing unit of claim 9, wherein at least one of the at least one risk location is represented by a risk dynamic trajectory, wherein each risk dynamic trajectory indicates a projected movement path of the risk.

11. The vehicle computing unit of claim 10, wherein the vehicle computing unit is further configured to:
classify a risk associated with each of the at least one risk location, wherein the risk dynamic trajectory of each risk location is calculated based on the classification of the risk associated with the risk location.

12. The vehicle computing unit of claim 9, wherein each of the first driving decision and the second driving decision includes a respective deceleration force value, wherein the selected driving decision is the driving decision among the first driving decision and the second driving decision including the highest respective deceleration force value.

13. The vehicle computing unit of claim 9, wherein the dynamic trajectory of the vehicle is calculated based on a stopping distance and a radius of movement of the vehicle.

14. The vehicle computing unit of claim 13, the vehicle having a front end and a center axis, wherein the dynamic trajectory includes two arcs, each arc representing the angular stopping distance of the vehicle, wherein each arc begins at a point along the front end of the vehicle, wherein the two arcs are located at a predetermined distance from the center axis of the vehicle.

15. The vehicle computing unit of claim 9, wherein the vehicle computing unit is further configured to:

receive an override option selection from the operator, wherein the dynamic trajectory is not calculated again while the override option selection is still valid such that none of the at least one risk location is determined as being within the dynamic trajectory until the override option is unselected.

* * * * *